(12) United States Patent
Vempati et al.

(10) Patent No.: US 8,163,036 B1
(45) Date of Patent: Apr. 24, 2012

(54) NANOPHASE MN(VII) OXIDE (NM70) AND NANOPHASE MN(III) OXIDE (NM30) INCORPORATED NONWOVENS

(75) Inventors: Rajan K. Vempati, Plano, TX (US); Gajanan S. Bhat, Knoxville, TN (US)

(73) Assignee: ChK Group, Inc., Plano, TX (US)

( * ) Notice: Subject to any disclaimer, the term of this patent is extended or adjusted under 35 U.S.C. 154(b) by 1043 days.

(21) Appl. No.: 12/103,818

(22) Filed: Apr. 16, 2008

Related U.S. Application Data

(60) Provisional application No. 60/911,934, filed on Apr. 16, 2007.

(51) Int. Cl.
*C11D 3/02* (2006.01)
(52) U.S. Cl. .................. 8/115.51; 8/115.54; 8/116.1
(58) Field of Classification Search .......... 8/115.51, 8/115.54, 116.1
See application file for complete search history.

(56) References Cited

U.S. PATENT DOCUMENTS

| | | | |
|---|---|---|---|
| 6,921,732 B2 * | 7/2005 | Vempati ..................... | 502/66 |
| 6,953,763 B2 | 10/2005 | Vempati et al. ............. | 502/66 |

OTHER PUBLICATIONS

Ko, F.K. 1999. Textile and Garments for Chemical and Biological Protection. Strategies to Protect the Health of Deployed U.S. Forces—Force Protection and Decontamination. (Eds. Wartell, A.W., Kleinman, M.T., and Huey, B.M.) National Academy Press, Washington, D.C., pp. 182-217.

Lin, S.T. and K.J. Klabunder 1985. Thermally activated MgO surface chemistry. Adsortpon and Decomposition of P compounds. Langmuir 1:600-605.

Vempati, Rajan K., et al.; "Nanophase Manganese Oxides Coated Nonwoven Applications"; Slide Presentation; 47 pages; Belt Wide Cotton Conference; New Orleans, Louisiana; Jan. 12, 2007.

\* cited by examiner

*Primary Examiner* — Eisa Elhilo
(74) *Attorney, Agent, or Firm* — Charles D. Gunter, Jr.

(57) ABSTRACT

NM7O and NM3O coated clay are embedded into a fabric matrix to produce a protective fabric. A NM7O blended garment can be manufactured for the purpose of containing malodors. The destruction of chemical warfare agents can also be accomplished by incorporating these materials into disposable protective clothing for military, Haz-Mat team and First responders. The fabrics so treated with MN7O have uses as diverse as for a disposable silver polish wipe. In the case of NM3O coated clay, the treated fabric can be used as a copper and brass polish.

13 Claims, 7 Drawing Sheets

PERSPIRATION
MOISTURE
VAPOR

AGENT VAPOR

LIQUID

AEROSOLS

SELECTIVELY PERMEABLE MEMBRANE

SHELL FABRIC

LINER FABRIC

SKIN

BODY

EVAPORATIVE COOLING

NANOPHASE MN(VII) OXIDE (NM7O) AND NANOPHASE MN(III) OXIDE (NM3O) INCORPORATED NONWOVENS

CROSS REFERENCE TO RELATED APPLICATION

The present application claims priority from provisional Ser. No. 60/911,934, filed Apr. 16, 2007, entitled "Nanophase Mn(VII) Oxide (NM7O) and Nanophase Mn(III) Oxide (NM3O) Incorporated Nonwovens, by the same inventors.

FIELD OF THE INVENTION

The present invention deals with the incorporation of selected nanophase manganese ions, including NM7O as well as other Mn oxides, into various fibers and nonwoven fabrics in order to provide fabric end products which can be used for a variety of useful purposes.

DESCRIPTION OF THE PRIOR ART

Fabric treatments which endow particular desired characteristics or activity are highly sought by sectors of the apparel, home furnishings, medical and scientific communities, as well as by the military. However, conventional processes used to impart such characteristics often did not achieve the desired results, led to less than permanent effects and were less than effective in decontaminating or rendering less harmful, for example, chemical warfare agents or various industrial toxins.

As an example, activated carbon has historically been incorporated into textiles for clothing and into filters to provide adsorptive protection. While activated carbon is extremely effective for adsorbing toxic vapors, activated carbon imparts only partial protection against chemical agents, which are captured through physical entrapment within its pores. Since this entrapment is a physical process, activated carbon does nothing to neutralize an absorbed chemical, it simply stores it. Such storage presents a host of problems, including the fact that these materials may be released over time.

Clothing is a second skin as it provides protection between a person and the environment (Ko, 1999). There are two chief approaches to using clothing to protect an individual from Chemical Warfare Agents (CWAs) and/or Toxic Industrial Chemicals (TICs) including malodors by providing: 1) an impermeable barrier, and 2) a semi-permeable barrier. The impermeable barriers are rubber and coated fabrics, which are very good barriers for Chemical and Biological Agents (CBAs), but do not allow moisture-vapor permeability. Such garments cause the wearers to feel hot and uncomfortable, and in the worst-case scenario, they may succumb to heat stress even after a minimum of physical activity. However, impermeable barriers are essential for hospital beds, baby mats, biological warfare suits, etc. Some of the requirements for chemical protective textiles are listed in Table 1 (Roth, 1982).

TABLE 1

Requirements for chemical protective textiles (Roth, 1982).

| | |
|---|---|
| Reduce heat stress | Reduced weight-to-bulk ratio |
| Combat uniform configuration | Longer service life |
| Longer shelf life | Fire resistance |
| Laundering capability | Decontamination capability |

TABLE 1-continued

Requirements for chemical protective textiles (Roth, 1982).

| | |
|---|---|
| Reusability | Camouflage capability |
| Water repellency | Perspiration resistance |
| Nontoxic materials | Compatible with other items |
| Moisture-vapor permeability | |

To achieve these properties in the garment, the right fibers have to be selected and the construction has to be engineered to accomplish the combination of properties. Requirements for fiber materials to be used as suggested by Ko (1999) are summarized in Table 2.

TABLE 2

Fibrous material properties requirement (Ko, 1999).

| Essential Requirements | Properties |
|---|---|
| Lighter weight | Lower fiber specific gravity and lower packing density |
| Less bulk | Smaller fiber diameter and higher packing density |
| Higher durability | Higher strength and toughness |
| More comfort | More permeability |
| Less heat stress | Better thermal conductivity |

In addition to providing adequate protection, and being comfortable to wear, the material must be capable of being mass produced at a reasonable cost and ideally capable of being maintained for extended use in the field. The need to provide a barrier between the man and the environment without simultaneously creating heat stress appears to present a contradiction. On the one hand, we need materials that are permeable to air and body moisture vapor, and at the same time provide a protective barrier to toxic chemicals in either liquid or gaseous phase. Hence, prudent selection of protective garments based on the level of hazard is required. Currently the trend is to use impermeable barrier approach for gloves, boots and other special equipment included for short-term use to provide liquid and toxicological protection, protective suit for contamination avoidance, etc. However, this considerably restricts the weapons usage during the attack period resulting in decreased mission accomplishment.

More recent approaches have been to use selectively permeable membranes (Truong et al 2003). Membranes are used worldwide in the chemical industry for gas separation, water purification by reverse osmosis and in medical applications. When thin membranes are combined with lightweight fabrics, they can result in composite materials with a barrier to hazardous chemicals while allowing moisture vapor transport. The Moisture Vapor Transport (MVT) will provide the wearer with stress relief by evaporative cooling. This will result in lightweight Chemical and Biological Warfare agents (CBAs) protective clothing that will be more comfortable without sacrificing any protection. For selective permeability, the pore size should be very small. The ideal approach is to have a reactive system embedded in the composite fabric structure that will neutralize the CBAs.

The particular reactive system which will give the optimum results is a subject which is being pursued with particular interest at the present time. To fulfill a long standing need to provide improved protective systems for military and civilian use, scientists have investigated a number of different technologies including the development of metal-based nanoparticles, including nanophase MgO. For example, Rajagopalan et al. (2002) studied the interaction of nanophase Mg oxide (NMO), an ultrafine powder with high surface areas coupled with reactive sites, with organophosphates, e.g., $(CH_3CH_2O)_2—P(O)OC_6H_4NO_2$ (paraoxon), $(CH_3CH_2O)_2P(O)F$ (DFP), and $(CH_3CH_2O)_2P(O)CH_2—SC_6H_5$ (DEPTMP) at room temperature and under purged $N_2$ to remove $O_2$ from the reaction chamber. The reactive acids are ion vacancies, and electron-deficient and electron rich sites (Lewis acid and base sites) are present at the edge/corners. Solid state NMR and IR spectroscopy indicate the destructive cleavage of the organophosphate in that the OR and F groups dissociate. On the other hand, —PO4, —F and —OR groups are bound to the surface and in case of paraoxon and DEPTMP results in non-disassociation of —O—$C_6H_4NO_2$ and the P—$CH_2SC_6H_5$, respectively.

Wagner et al. (1999) studied the reaction of CEES with nanophase MgO and concluded that the result was hydrolyzed to thiodiglycol and divinyl sulfide, which are irritants. Further limitations of this technology for use on Chemical Warfare Agents (CWAs) are: 1) the fact that high temperature process and vacuum are essential for manufacturing, 2) incomplete breakdown of organophosphates was achieved; hence, the toxicity of byproducts of surety chemicals need to be evaluated, and 3) the essential requirement to store at ambient atmosphere for an extended time. The research appears to have been performed in inert atmosphere (absence of $O_2$ and water) which may be critical for a real world situation. Therefore, its application in protective gear may not be practical.

U.S. Pat. No. 6,953,763, entitled "Solid Support Stabilized Mn(II) and Mn(VII) and Method of Preparation," by Vempati and Son, describes a new form of Mn(VII) valence state material having useful properties for attacking CWA's. The Applicant's were the first to have produced this stable form of Mn(VII), which is neither a salt, nor a crystalline material, but rather an amorphous solid.

In the past, due to the unique physical properties and size of nanoparticles, certain difficulties have been encountered in separating and fixing the nanoparticles into a tangible form that could be flexibly integrated into protective systems of the type under consideration. The present invention has as its primary object to address these shortcomings in the prior art in providing a robust and precisely controllable methodology to durably attach agents to fibers and nonwoven materials, without impairing the desired characteristics of the agent.

Another object of the invention is to provide an improved reactive agent and method of manufacture in the field of fabric and textile treatments which provides certain substantially permanent desirable characteristics to such textile end products.

Another object of the invention is to provide an improved family of protective textiles, and in particular, to reactive and adsorptive textiles for providing multi-functional protection from CWA's and Toxic Industrial Chemicals (TIC's) and methods for providing and using such textiles for decontamination type purposes.

The technologies discussed in the Detailed Description which follows have the capability to be incorporated into fabrics to protect against CWAs and TICs.

SUMMARY OF THE INVENTION

The preferred fabrics of the invention have incorporated therein a unique Nanophase Mn(VII) oxide, (NM7O) and/or Mn(III) oxide (NM3O). In one preferred method of the invention, a fabric is formed from a material having protective properties. First, a quantity of NM7O is prepared. The NM7O is then incorporated into the fibrous material. The fibrous material is then used to form a fabric. The fibrous material can be selected from the group consisting of natural and man made fibers. For example, the fibrous material can be natural cellulosic fiber, cotton and synthetic cotton fibers, polylactic acid (PLA), polyurethane (PU), and blends of cotton/PLA. The amount of NM7O which is incorporated into the fabric is typically in the range from about 1 to 10% by weight, based upon the weight of the fabric.

In one preferred manufacturing method of the invention, a suitable starting fabric is provided in the form of a fabric web. The fabric web is immersed using a dip-nip process in a solution containing NM7O. The fabric is then squeezed in order to squeeze out any excess solution. The resulting fabric product is then dried/cured to form an end product. In this preferred method, fabric is a film/web having a polymeric structure which has been dipped in a solution containing NM7O, or NM7O with clay support, whereby NM7O is adhered onto the polymeric structure to form a protective fabric. The fabric can have a fiber structure and wherein the fabric is squeezed to remove any excess solution and to help to force dispersed solution which is present into the fiber structure. The fabric film/web of dipped, squeezed fabric is then heated in an oven to dry any solvent which is present and to stick the particles of NM7O present in the substrate. The fiber structure can be formed from a thermoplastic polymer which has been modified by the addition of a NM7O reactive agent which gives the polymer protective properties. For example, the polymer can be selected from the group consisting of thermoplastic polymers selected from the group consisting of Polypropylene (PP), Polyethylene (PE), Polyethylene terephthalate (PET), Polybutylene terephthalate (PBT) nylons, and elastomers, the modified polymer being used produce an end product selected from the group consisting of fibers, films nonwovens and membranes.

The thermoplastic polymer can conveniently be extruded into different parts or shapes by initially melting the polymer using an extruder, and then forcing the molten polymer through a die or into a mold, and then cooling to solidify it in the desired shape or form. The solid particles of NM7O can also be incorporated within the fiber or fibrous material during a melt spinning operation. The novel Nanophase Mn(VII) oxide (NM7O) which is used in the practice of the invention is a stable and strong Lewis acid and Mn(III) oxide (NM3O) is a good electron donor or acceptor depending upon the environmental conditions. These unique minerals are synthesized by reacting 1, 4 phenylenediamine compound with Mn(II) mineral at a specified pH. This is a single step, simple and rapid process. Also, Mn(VII) oxide and Mn(III) oxide are violet and green colored respectively, and coupled with distinct visible band spectra making it possible to develop 'Smart Fabrics'. The NM7O can also exist in aerosol sprays, lotions, powders, solution, or solid support or coated forms. The NM3O is synthesized on ion exchangers, e.g., clays and zeolites, as the pure NM3O dissolves in acidic pH. The research shows that NM7O has the capacity to destroy Lewis bases, e.g., N, S, O and P containing lone pairs of electrons including oxidation of mustard gas and sarin gas surrogates, and Toxic Industrial Chemicals (TICs). The NM7O is effective in both polar and non-polar solvents, the redox reaction occurs on its surfaces, and no Mn is released into the solvent.

Other uses of the novel materials of the invention are also envisioned. For example, tests have shown that clay coated Mn(III) oxide are good copper and brass polishers. More research is being conducted to develop additional applications.

The spent NM7O and NM3O materials of the invention can be disposed of safely in a municipal landfill. Applicant's NM7O-clay has been incorporated into different nonwoven fabrics, e.g., needle-punched cotton nonwoven, through an air bonded cotton/PLA web and a meltblown polyurethane web, and evaluated for their performance. Also, NM7O was incorporated in the web structure during meltblowing demonstrating the ability to introduce NM7O into polymeric products during fabrication such as fiber, film, web or membrane formation. Air permeability data indicates that these webs have good permeability and these values did not change due to incorporation of NM7O coated clay. Studies show that air bonded cotton/PLA web coated NM7O-clay is effective in polishing silver, odor control, and protection against Chemical Warfare Agents (CWAs) and Toxic Industrial Chemicals (TICS). Furthermore, the NM7O incorporated reactive garments will have both military and civilian applications including for the use for HazMat- and first response-teams.

Additional objects, features and advantages will be apparent in the written description which follows.

BRIEF DESCRIPTION OF THE DRAWINGS

FIG. 1 is a simplified illustration of a suggested protective clothing material concept which could be utilized with the Mn materials of the present invention.

FIG. 2 is an illustration of the structural formula for 1,4-phenylenediamine, a reactant used in preparing the Mn materials of the invention.

DETAILED DESCRIPTION OF THE INVENTION

Figure 3:
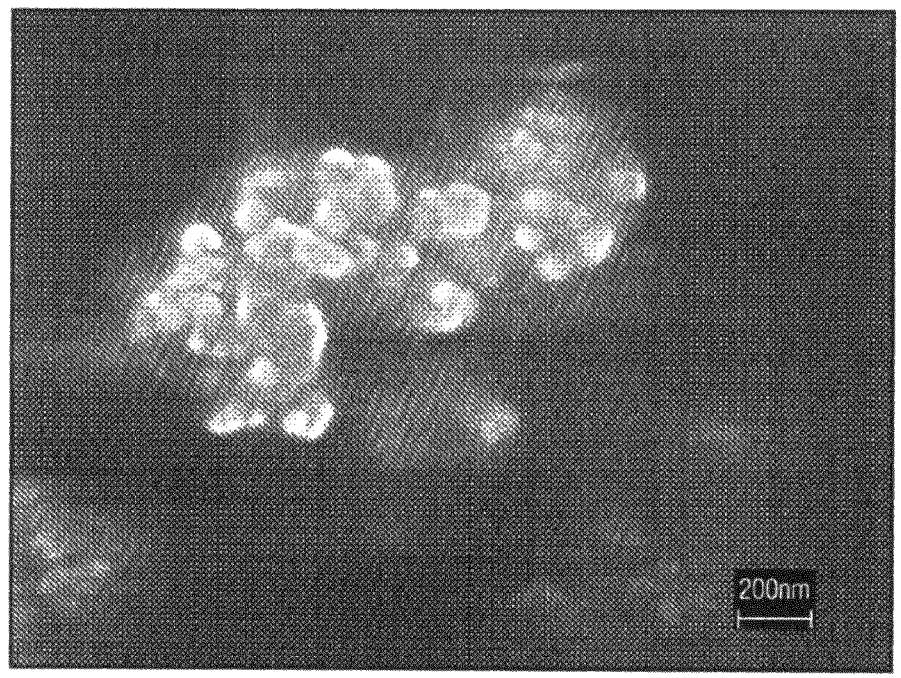
FIG. 3 is a scanning electron micrograph of Nanophase Mn(VII) Oxide, NM7O, one of the manganese materials useful for the practice of the present invention, the scale bar being 200 nm.

The present invention comprises a fiber, fibrous material, fabric or textile onto which the unique particles of the invention have been adhered for providing a resultant protective system which has the potential to protect against both chemical warfare and toxic industrial chemical threats. For example, these protective systems may be used to manufacture protective textiles for use as clothing or shelters. For example, as discussed briefly in the Background Discussion, the nanophase particles of the invention might be incorporated into a selectively permeable membrane type material. A typical construction of such a composite fabric is shown in FIG. 1 (Wilusz, 1998). For selective permeability, the pore size should be very small. The ideal approach is to have a reactive system embedded in the composite fabric structure that will neutralize the CBAs. Such a system will be described in detail in the description which follows.

The fabrics of the invention are manufactured by incorporating novel Nanophase Mn(VII)Oxide or Mn(III)Oxide particles into the fabric. The characteristics of the two particles used in the practice of the invention will now be briefly described, followed by a more detailed description of their synthesis and the method for incorporating these materials into the end fabrics of the invention.

Nanophase Mn(VII) Oxide (NM7O):

The fabrics of the invention utilize what will be referred to herein as "nanophase Mn(VII) mineral" for convenience. The nanophase Mn(VII) mineral consists of with and without solid support NM7O. Based upon Applicant's experience, the solid-support nanophase Mn(VII) oxide appears to be more reactive than the without support material, as the former material provides more active surface electron sites compared to the latter material as they form aggregates resulting in decreased sites. The solid supports used for the study is bentonite clay (hydrophilic mineral).

This NM7O offers several advantages for blending into fabrics:

1. Ability to be coated onto a hydrophilic or hydrophobic support material and yet be able to degrade chemical warfare agents (CWAs) and toxic industrial chemicals (TICS):
2. Capability to sorb and remove sweat/perspiration malodor.
3. Longer shelf life and temperature stability at >800° C.
4. Camouflage capability. The color of the NM7O and NM7O-supported clay is violet.
5. Operates in aqueous and non-aqueous solvents as the degradation occurs at oxide surfaces by electron transfer processes, and
6. Non-toxic and environmentally friendly.

The blending of NM7O into fabrics, especially nano-fibers should provide less resistance to air movement and greater surface area for adsorption and degradation of CWAs. Such an approach will be simple, economical, efficient and more attractive for both military and civilian applications. This breakthrough technology will help in developing protective garments that are lighter, cheaper, laundrable, and comfortable to the soldier or first responder and civilian population.

Nanophase Mn (III) Oxide (NM3O)

Based upon Applicant's experimental process, pure NM3O is not possible to form without the coating on ion exchangers, e.g., clays and zeolites. This is due to the fact that Mn oxides are not stable at low pH (<3). Currently, Applicant's have observed that it is a good copper and brass polish as it has the ability to remove oxide coatings on metals; other applications to oxidize organic compounds and inorganic metals are being tested.

Synthesis and Characterization of Nanophase Mn(VII) Oxide (NM7O):

The synthesis and characterization of NM7O and NM3O are summarized below.

NM7O Syntheses

Phenylenediamine (PDA) isomers are the reagent responsible for the preparation of the various Mn oxidation states (Vempati and Son, 2005). The p-(1,4-PDA) isomer is responsible for the formation and stabilization of NM7O (See FIG. 2) at pH and for NM7O at pH≦0. The starting material for both the Mn oxidation state is the Mn(II) mineral (beige color) which is MnO and/or $Mn(OH)_2$.

Solid Support Materials and Advantages

The following support materials were used to make either NM7O- or NM3O-coated substrate:
  i) L 10 Bentonite Clay is a montmallonitic hydrophilic clay procured from Southern Clays, Gonzales, Tex., and
  ii) ZSM 5, a hydrophobic zeolite from Zeolyst, Pa.

The advantage of solid supported Mn minerals is that the concern of nanoparticles releasing into environment is significantly minimized as the mineral is bound chemically to the surfaces of micron sized ion exchanged particles. Secondly, based upon Applicant's studies, coated NM7O are very reactive as compared to uncoated as the exposed Mn(VII) oxide surfaces is greatly enhanced.

Degradation of 1,4 Phenylenediamine (PDA)

The consumption of PDA during the preparation of NM7O was observed using 400 MHz $^1H$ NMR spectroscopy techniques (Figure not shown). This study showed that the concentration of PDA was clearly diminished compared to the standard, confirming that 1,4-PDA was being consumed in the reaction. No other peaks were present in the $^1H$ NMR spectrum, and Fourier Transform Infrared (FTIR) did not show presence of any amine group.

Scanning Electron Microscopy (SEM) of NM7O

The SEM image of pure NM7O showed particle size ranging from 50 nm to 100 nm confirming that these are nanomaterials (FIG. 3). Since Mn(III) oxide is on a clay support no SEM imaging work was performed.

Mn-Oxidation States

The NM7O and NM3O oxidation state was confirmed by cyclic voltammetry and optical spectroscopy techniques.

Cyclic Voltammetry

Figure 4:
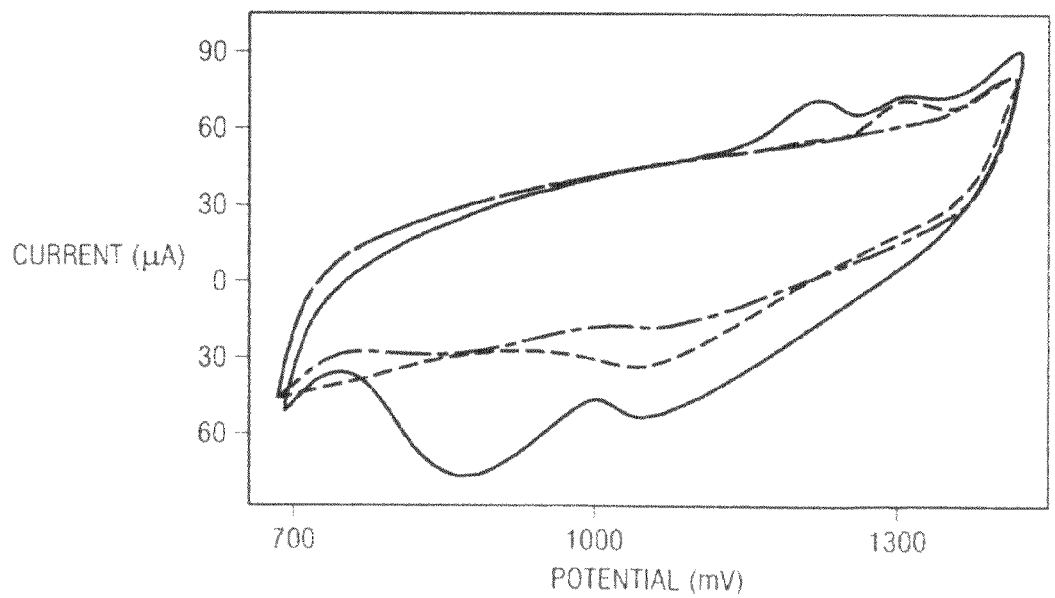
FIG. 4 is a cyclic voltammogram illustrating various oxidation states of supported manganese where current is plotted against potential. The solid curve is a cyclic voltammogram for supported Mn(II). The dotted line corresponds to a cyclic voltammogram for supported Mn(III). The dashed curve is a cyclic voltammogram for supported Mn(VII).

Cyclic voltammetry plot of NM7O dissolved in 6N HCl was similar to that of $KMnO_4$ in aqueous solution (dashed curve) in that two broad peaks obtained on the reverse potential scan at 1020 and 820 mV, suggesting the oxidation state of VII (FIG. 4). For Mn(III) oxide dissolved in 6N HCl, the positive potential scan indicated a single peak corresponding to Mn(IV) was observed at 1300 mV in the forward potential, and a peak at 1020 mV (Mn(IV) to Mn(III)) was observed in the reverse potential scan. These results are consistent for a solution containing a Mn(III) substance and reveal that the supported Mn(III) is quite stable (See dotted line).

Optical Spectroscopy

Figure 5:
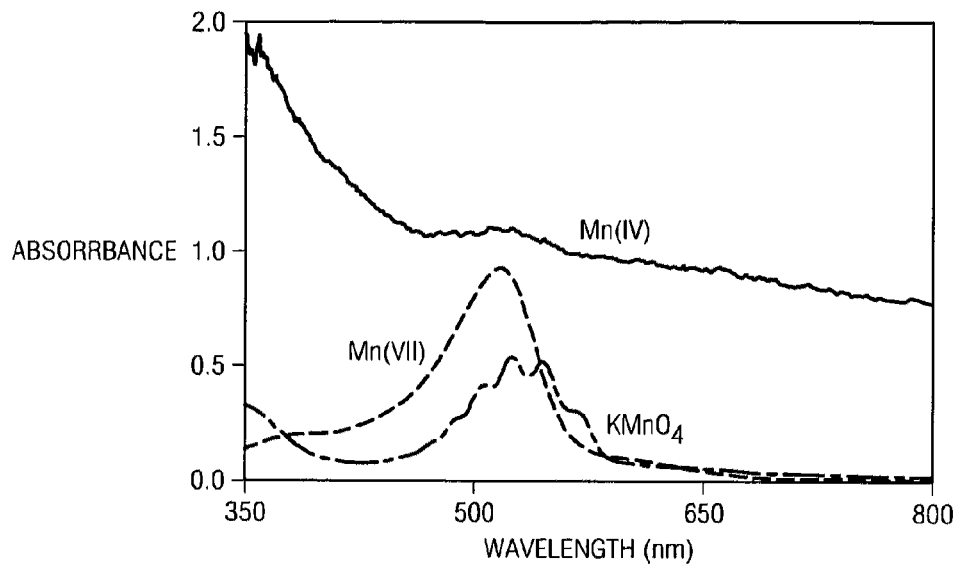
FIG. 5 is a graph of the Spectra of Mn(IV)- and Mn(VII)-Oxides in the visible region.

Recent optical spectroscopy in the visible region (300 nm to 700 nm) shows that the various Mn oxidation states have distinct features. The Mn(II) oxide has bands at 521 nm (strong) and 484 nm (shoulder) (Fig. not shown), Mn(III) oxide at 674 nm, Mn(IV) oxide has no band and Mn(VII) oxide at 518 nm (broad) with no shoulder at 484 nm. This can be exploited to make an optical sensor (FIG. 5) to monitor the reaction and/or exhaustion of the starting material during Redox reactions.

Thermal Stability of Nanophase Mn(VII) Oxide

The NM70-clay is stable up to greater than 1000° C. and retains its violet color. This is an advantage as any residual or trace amounts of organic compounds can be removed by incinerating at 450° C. and yet be used as a catalyst at high temperatures without decomposing the starting material.

The Objectives of Applicant's Experimental Studies:

The objectives of this study are to: 1) test selected properties of the NM7O and NM3O-clay coated into selected fabric materials, and 2) determine the reactivity of these Mn-clay coated fabrics for selected applications, e.g., metal polishers, chemical warfare agents and toxic industrial chemical protective suites, and odor control garments.

EXPERIMENTAL

The NM7O and NM3O were synthesized by adding 1,4-phenylenediamine to Mn(II) mineral and/or Gonzalez clays. The Mn(VII) and Mn(III) oxidation states were determined by cyclic voltammetry and optical spectroscopy in the visible region.

Mn(VII) Oxide (NM7O) Synthesis

The solid support material used for the present study is a-hydrophilic bentonite clay. To a-250-mL glass beaker containing a magnetic bar, 18 g of $MnCl_2$ was dissolved in 100 mL of distilled water and placed on a magnetic stirrer. After 15 min, 50 g of bentonite clay was added and the suspension equilibrated for 15 min. Then, the pH raised to 8.5 using NaOH, resulting in beige colored precipitation of Mn(II) mineral on the clay surfaces. After 30 min of equilibration, 1 g of 1,4-PDA was added and temperature of the beaker raised to 70° C.; following three hrs of stirring the suspension color changed to violet indicating the formation of nanophase Mn(VII) oxide (U.S. Pat. No. 6,953,763). The material was either stored as slurry or air-dried at 80° C. The clay contained a-10% Mn coating. This basic process is described in issued U.S. Pat. No. 6,953,763 "Solid support stabilized Mn(III) and Mn(VII) and Method of Preparation", Vempati and Son, and to the extent not more fully described herein, the entire disclosure of which is incorporated herein by reference. In the case of the synthesis of NM3O, the pH was lowered to 3 after the addition of 1,4-PDA and the rest of the procedure is similar to that described for NM7O.

MN7O Incorporated Textile Materials

Three different nonwoven fabric samples were used in this study to coat the MN7O-clay and NM3O-clay. They were a-80 gsm needle-punched cotton nonwoven, a through air bonded cotton/PLA web and a meltblown polyurethane web. Needled cotton web was supplied by Cotton Incorporated, Raleigh, N.C., and the meltblown PU and cotton/PLA produced at the University of Tennessee, Knoxville, Tenn. (UTK). These webs were either produced or cut to the width to process continuously in the Mathis padding drying equipment. All the padding experiments were carried out using the 350 mm width Mathis 2 roll laboratory padder type VFM. The padded samples were dried/cured using a commercial Mathis KTF dryer.

The basis weight of the fabric, which is the mass per unit area, was determined by weighing samples cut to known area using the standard templates. The thickness of the webs was determined according to the standard test method ASTM D 1777-64, using a TMI 49-70-00 micrometer.

The air permeability of the samples was measured using a TEXTEST FX-3300 Air Permeability Tester. This tester is used for fast, simple and accurate determination of the air permeability of all kinds of materials ranging from dense, coated fabrics to extremely open paper making felts. The instrument operates automatically and digitally in accordance to the standard method used, and ASTM D 737 was followed for this test. The air permeability of the test specimen is determined from the pressure drop across this orifice, and is digitally displayed. An average of two to three measurements is reported.

Meltblown Nanophase Mn(VII) oxide (NM7O) Incorporated Fibers.

Another important approach is to incorporate nanophase oxides into polymers while processing them to fabricate products. If these oxides can be introduced during for example conversion of thermoplastic polymers into fibers, films or membranes, the oxides are permanently embedded in them To demonstrate that this approach works, Applicant's tried to incorporate nanophase Mn(VII) Oxide (NM7O) into a polymer during a particular type of melt blowing process (FIG. 6).

Figure 6:
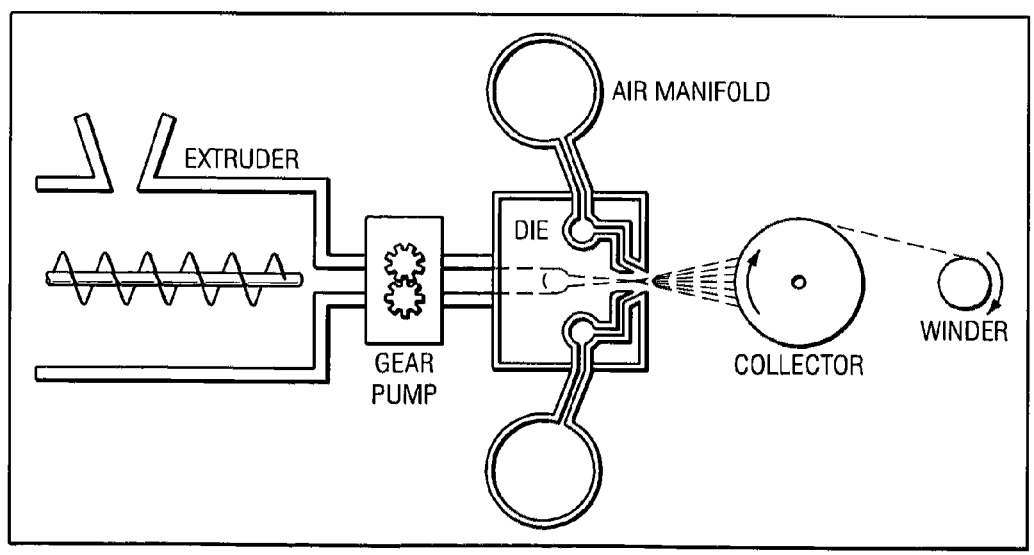
FIG. 6 is a simplified schematic illustration of a typical fabric melt blowing process of the type which might be used in the process of the present invention.
Figure 7B:
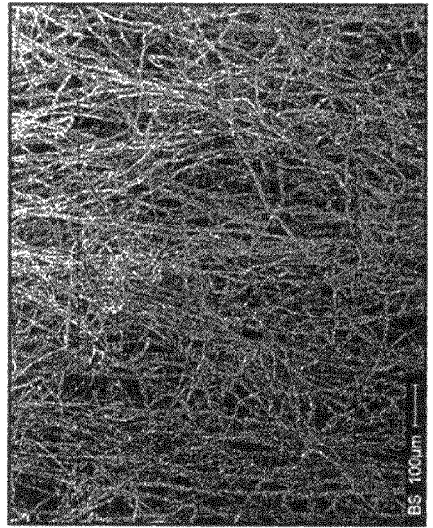
FIGS. 7(a)-7(d) are Scanning Electron Microscope images and Energy Dispersive X-ray analysis of uncoated NM7O (a and c) and coated NM7O (b and d).
Figure 7D:
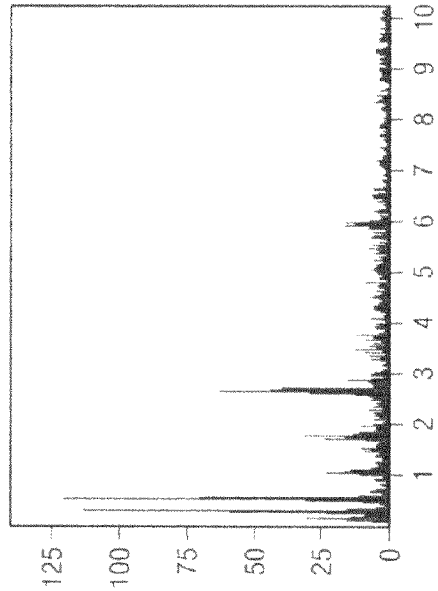
Figure 7A:
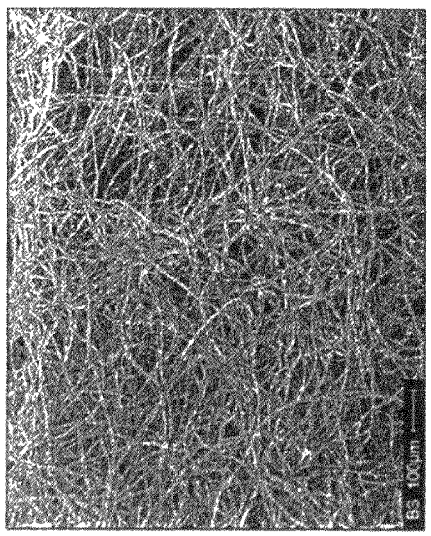
Figure 7C:
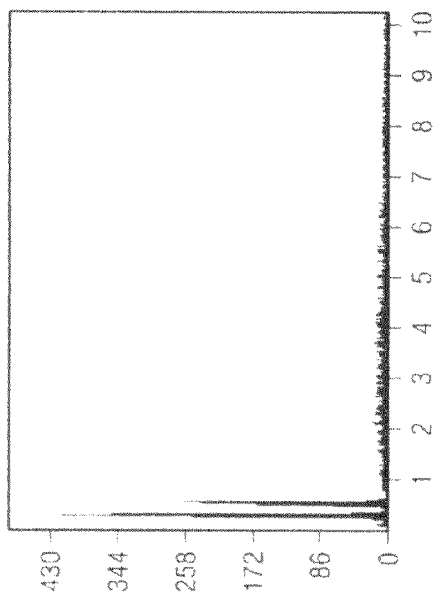

The melt blowing process shown in FIG. 6 is unique because it is used almost exclusively to produce micro-fibers rather than fibers the size of normal textile fibers. Melt-blown micro-fibers generally have diameters in the range of 2 to 4 μm, although they may be as small as 0.1 μm and as large as 10 to 15 μm. Differences between melt-blown nonwoven fabrics and other nonwoven fabrics, such as degree of softness, cover or opacity, and porosity, can generally be traced to differences in filament size. The melt-blown process converts resins to nonwoven fabrics in a single integrated process. As soon as the molten polymer is extruded from the die holes, high velocity hot air streams (exiting from the top and bottom sides of the die nose-piece) attenuate the polymer streams to form micro-fibers. As the hot air stream containing the micro-fibers progresses toward the collector screen, it draws a large amount of surrounding air (also called secondary air) that cools and solidifies the fibers. The solidified fibers subsequently get laid randomly onto the collecting screen, forming a self-bonded nonwoven web. The fibers are generally laid randomly (and also highly entangled) because of the turbulence in the air stream, but there is a small bias in the machine direction due to some directionality imparted by the moving collector. Meltblown fabrics are used in applications such as filtration media, medical fabrics, sanitary products, oil sorbents, apparel, wipers, hot-melt adhesives, electronic specialties, specialty fibers, and other miscellaneous applications.

In this work, specifically, polybutylene terephthalate (PBT) polymer was used. The NM7O particles were mixed with the polymer melt and compounded to form concentrates (10% of oxides in polymer). Then the master batch was mixed with polymer to achieve different concentrations and then melt processed using the six-inch wide melt blowing line at the University of Tennessee, Knoxyille (UTK). The schematic of the melt blowing set up is shown in FIG. 6.

In this case two different levels of additives (2.5% and 5%) in the final fabric were achieved. The process was successful, and the microfiber webs produced showed the presence of reactive NM7O. This study clearly shows that reactive NM7O can be added to any thermoplastic polymer (such as PPs, PETS, PEs, Nylons, Elastomers etc) to produce any products such as fibers, films, nonwovens, membranes and so forth. This could also be part of extrusion coating of products, where the melt will have the added NM7O.

Selected NM7O Applications

The following applications were tested to determine the efficacy of NM7O-clay and fiber coated NM7O-clay. For example the surrogates of Chemical Warfare Agents (CWAs) were tested with NM7O-clays. Silverware polish and mercaptan degradation were tested on fabrics coated with NM7O-clay.

Metal Polish

A tarnished silver bowl was taken, and the air bonded cotton/PLA web double coated with NM7O-clay was cut into strips and dipped in water. The tarnish in silverware is caused to reduced S. The wet fabric was then used to polish the silverware. Finally, the bowl was cleaned using a dish-washing soap. Similarly, NM3O was used to polish the tarnished copper- and brass-wares, which is caused by oxide coatings. A cotton cloth was dipped into a NM3O clay coated slurry and rubbed gently against the metal surfaces till shining luster was observed. The polished metal was rinsed with cold soap water to remove the adsorbed material.

Odor Control

This study was conducted using 2-mercaptoethanol (aliphatic) and benezenthiol (aromatic) compounds to determine the kinetics and reaction stoichiometry using $^1$H (Nuclear Magnetic Resonance) NMR 400 Hz instrument. In this experiment 20,000 ppm and 40,000 ppm of 2-mercaptoethanol and benezenthiol were dissolved in $CDCl_3$ (deuterated chloroform); respectively, and treated with 10% NM7O-coated clays at room temperature.

The high concentrations of mercaptan were taken as the Gas Chromatograph and Mass Spectrophotometer (GC-MS) used for the study was not sensitive to measure low mercaptan and/or by product concentrations. The samples were placed in a closed container at room temperature for 24 hrs, and the smell test was conducted at regular interval. At the end of 24 hrs the GC-MS of the solution was run to determine the presence of mercaptan. This test showed that the through air bonded cotton/PLA web double coated with NM7O-clay and the meltblown polyurethane web coated with NM7O-clay successfully destroyed mercaptan (rotten egg smell) to disulfide compound (fragrant smell).

Chemical Warfare Agents (CWAs) Test Using Surrogate

The testing was conducted using 2-chloroethyl ethyl sulfide (CEES), sulfur mustard analog, and dimethyl methyl phosphonate (DMMP), sarin compound analog. A 5,000 ppm of CEES solution dissolved in dichloromethane was prepared for the experiment. Two gms of MN7O-clay (heated to 450° C.) were added to separate conical flasks, each containing 20 mL of 5,000 ppm CEES. The flasks were placed in a bath maintained at 70° C. and the contents were refluxed for 3 hrs. Balloons attached to needles were placed at the top of the capped reflux units to collect evolved gases. Considerable amount of gas evolved in the NM7O flask within 15 min of reaction. The Gas Chromatography and Mass Spectrometer (GC-MS) spectra of original starting material and NM7O-clay reacted sample was collected.

Result and Discussion

In this section, the selected tests on NM7O-clay and fabric coated NM7O-clay are discussed.

Fabric Coated NM7O-Clay

All the padding experiments were carried out using the Mathis 2 roll laboratory padder type VFM, 350 mm width. The padded samples were dried/cured using the Mathis KTF dryer. The scanning electron micrographs (SEM) and the elemental compositions of clay coated NM7O on Cotton-PLABico, as analyzed by energy dispersive X-ray analysis (EDAX), are given in FIG. 7 and Table 3.

TABLE 3

Properties of selected fabrics coated with NM7O-clay.

| Sample | Feed | | | Coated | Washed | | |
|---|---|---|---|---|---|---|---|
| | Basis wt. gsm | Air Perm cm³/cm²/s | Thickness mm | Basis wt. gsm | Basis wt. gsm | Air Perm cm³/cm²/s | Thickness mm |
| Cotton needled† 1 Dip‡ | 79.90 | 145.00 | 1.17 | 85.25 6.70% | 80.29 0.49% | 160.71 | 1.34 |
| CottonPLABico¶ 1 Dip‡ | 80.72 | 277.00 | 1.70 | 131.30 62.66% | 81.70 1.21% | 253.77 | 1.33 |
| CottonPLABico§ 2 Dip‡ | 80.72 | 277.00 | 1.70 | 172.70 113.95% | 89.35 10.69% | 297.99 | 1.31 |
| PU 1 Dip‡ | 93.36 | 75.14 | 0.32 | 122.97 31.72% | 100.84 8.01% | 73.62 | 0.37 |

Abbreviation wt = weight,
Air perm = Air permeability.
†Provided by Cotton incorporated - probably has Needleloom oil
‡Dip bath: 10% Mn + clay slurry, Press Roll at 6Bar, web dried at 90' C., 4 min, speed 0.2 m/min
§Through Bonded at 200° C., 4 min before coating using the Mathis KTF Dryer.
¶Hand washed in water (1 gal/fabric sample, twice) and overnight dried in lab.

Figure 8:
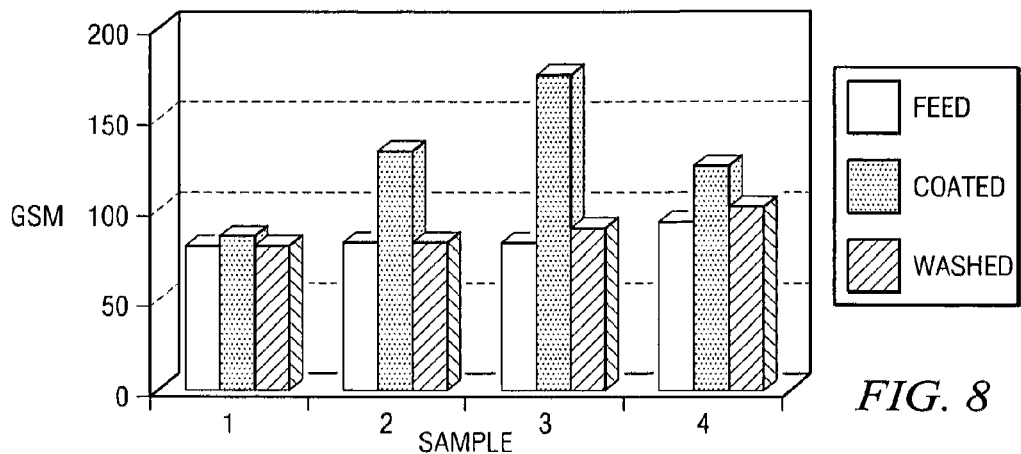
FIG. 8 is a graphical representation of the variation in sample weight upon coating various fabrics, namely (1) cotton needled; (2) cottonPLA Bico dipped once; (3) CottonPLA Bico dipped twice and (4) polyurethane.

The SEM images showed that the coatings were on the surfaces of CottonPLA Bico and not in the porous structure. The EDAX showed the presence of C and O, as it is not sensitive to H in the original CottonPLABico but additional elements, e.g., Si, Al, Ca and Mn were present in the coated samples because of the presence of clays and Mn oxides. Weight, thickness and air permeability of the fabrics before and after padding with MNO7 are shown in Table 3, and FIGS. 8 and 9. From the weight of the samples before and after padding, it is obvious that there was significant amount of MN7O incorporated in the nonwoven samples ranging from 6.7 to 113.95%. However, add on values were different for various fabrics, although similar padding conditions were used (FIG. 8). This is due to the differences in the fabric composition as well as structure. Also, going through additional padding sequence showed an increase in loading level. These data from initial experiments clearly indicate that the level of MN7O incorporation can be controlled in these webs. Also, the observed difference in add on levels with various fabric structures gives another approach to engineer the products depending on the requirements for the desired applications.

Figure 9A:
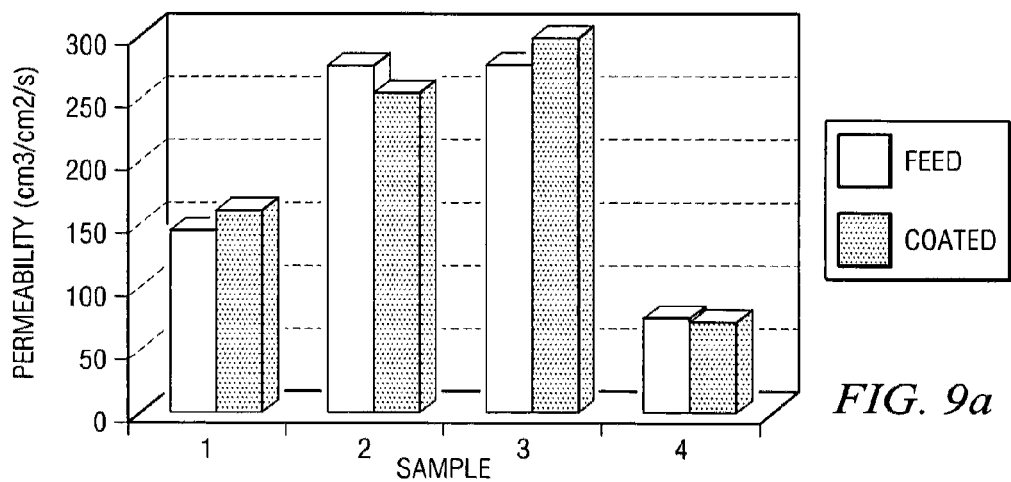
FIGS. 9(a) and 9(b) are graphical representations of (a) air permeability and (b) variation in sample thickness with coating where (1) is cotton needled; (2) cottonPLA Bico dipped once; (3) CottonPLA Bico dipped twice and (4) polyurethane.
Figure 9B:
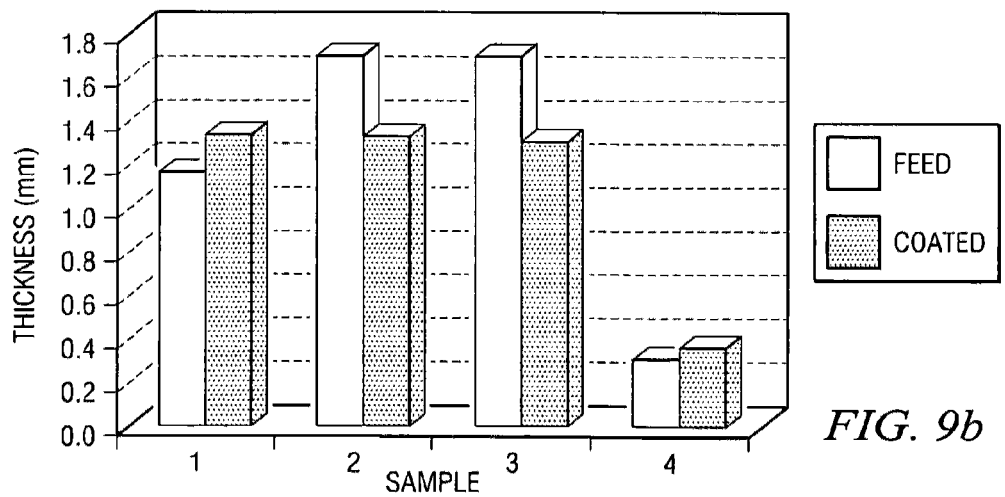

Actual add on values varied from 6.7% for cotton needled to almost 62.66% for one dip cotton/PLA through air bonded. Low add on value for the needled fabric may be due to lower wettability characteristics because of residual finish oil on the webs. Higher level with cotton/PLA is due to the more open structure of the starting material, because of the way they were produced. Thus their air permeability was not affected (FIG. 9a). These webs also showed further consolidation during padding as seen from change in thickness. The thickness values did not show any appreciable change in other webs (FIG. 9b). PU webs because of their microporous structure, high surface area, as well as due to the affinity of PU to such chemicals showed a good add on level. Cotton/PLA webs have relatively poor adhesion to the NM7O clay additive. This needs to be further addressed by the combination of pretreatments and processing conditions. Also, use of different recipes, such as, with different amount of solid to solution ratio or unsupported MN7O clay will be tried. Air permeability data indicates that these webs have good permeability and the permeability values did not change because of the incorporation of the MN7O, which may be on the fiber surface or is getting inside the fibers.

Washing MN7O Coated Fabrics

On washing, add on levels changed with all the webs as some of the added MNO7 was not fixed well under these conditions. PU fabrics showed better retention, and cotton and cotton/PLA relatively poor adhesion. This needs to be further addressed by the combination of pretreatments, and under these processing conditions used as higher fixing temperatures. Also, use of different recipes, such as, with different amount of solid to solution ratio or unsupported MN7O clay will be tried. Air permeability data indicates that these webs have good permeability and the permeability values did not change because of the incorporation of the MNO7, which may be on the fiber surface or is getting inside the fibers.

For example, for polish and other disposal garment/fabric applications the retention of NM7O-clay is not essential.

Silver Polish

The double dip cotton/PLA through air bonded double-coated NM7O-clay demonstrated that it can be used for polishing silver. Also, during polishing the violet colored fabric changed to brown indicating that it oxidized organic S compounds which are primarily responsible for tarnishing silverwares.

Odor Control

The kinetics and reaction stoichiometric studies were conducted on the mercaptan degradation.

Kinetics and Reaction Stoichiometric Studies

The mercaptan and its byproducts were determined by 400 MHz Bruker Avance ($^1H$, $^{13}C$, $^{31}P$, $^{29}Si$, $^{19}F$) Nuclear Magnetic Resonance (NMR) spectrometer. The qualitative and quantitative analyses were determined using $^1H$ NMR. For the percent degradation the ratio of $^1H$ was used. Table 4 shows the spectral values of reactant and product.

TABLE 4

The structures of the starting mercaptan compounds and their byproducts, and reaction kinetics.

| Reactant | Byproduct | Solvent | % Mercaptan Degradation |
|---|---|---|---|
| 2-Mercapto-ethanol (HO-CH₂CH₂-SH) | 2-(2-Hydroxy-ethyldisulfanyl)-ethanol (HO-CH₂CH₂-S-S-CH₂CH₂-OH) | $CDCl_3$ | 1.28 mmoles g$^{-1}$ in 2 h; 2.56 mmoles g$^{-1}$ in 24 h |
| Benzenethiol (Ph-SH) | Ph-S-S-Ph | $CDCl_3$ | 2.52 mmoles g$^{-1}$ in 24 h |
| 2-Mercapto-ethanol (HO-CH₂CH₂-SH) | 2-(2-Hydroxy-ethyldisulfanyl)-ethanol (HO-CH₂CH₂-S-S-CH₂CH₂-OH) | $CDCl_3$ | 1.28 mmoles g$^{-1}$ in 2 h; 2.56 mmoles g$^{-1}$ in 24 h |
| Benzenethiol (Ph-SH) | Ph-S-S-Ph | $CDCl_3$ | 2.52 mmoles g$^{-1}$ in 24 h |

In case of 20,000 ppm containing 2-mercaptoethanol 50% and 100% degradation were observed in 2 hrs and 24 hrs, respectively (Table 4). Whereas, for 40,000 ppm-containing benzenethiol, 50% degradation of the compound was observed overnight. The amount of degradation of 2-mercaptoethanol was 1.28 mmoles per g of 10% NM7O coated clay in 2 hrs and 2.56 per g of NM7O coated clay in 24 hrs. And in case of benzenethiol, 2.52 mmoles was destroyed by 1 g of 10% NM7O coated clay in 24 hrs.

Surrogate Chemical Warfare Agents (CWA) Reaction with Nanophase Mn(VII)Oxide (NM7O)

Figure 10A:
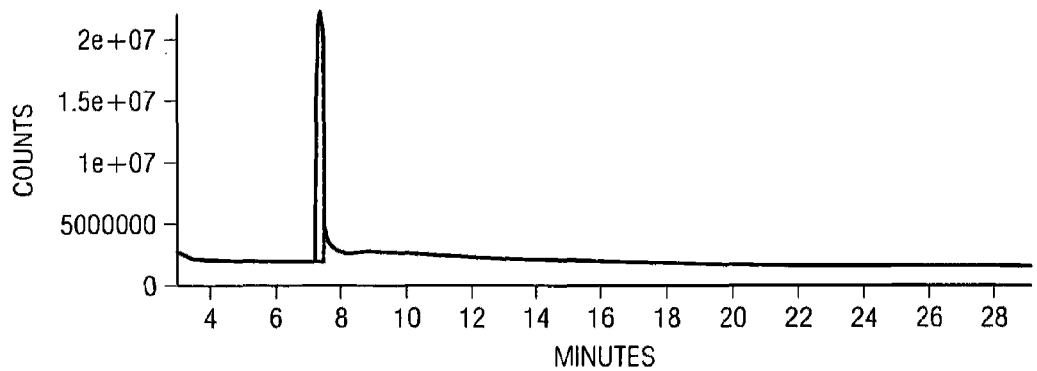
FIGS. 10(a)-10(c) are mass spectrographs with a) starting material containing 5,000 ppm of 2-chloroethyl ethyl sulfide (2-CEES), b) two gms of KMnO4 reacted with 5,000 ppm of 2-CEES, and c) one gm of clay coated with 10% Mn(VII) oxide reacted with 5,000 ppm of 2-CEES. The absence of 7.36 min peak indicates the destruction of the CEES compound. Pure clay did not destroy CEES.
Figure 10B:
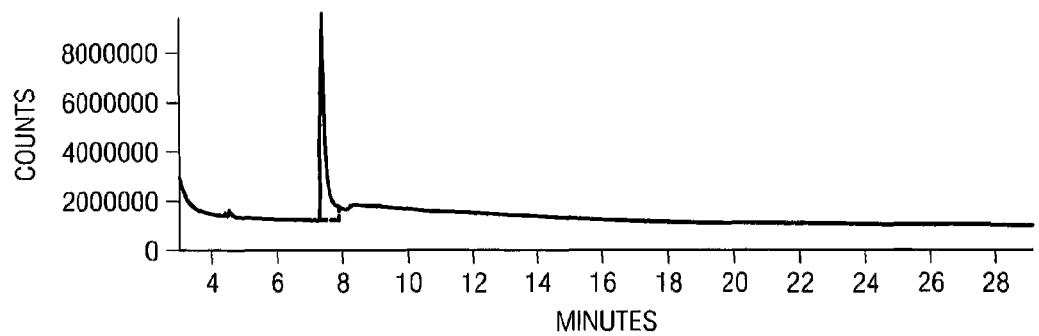
Figure 10C:
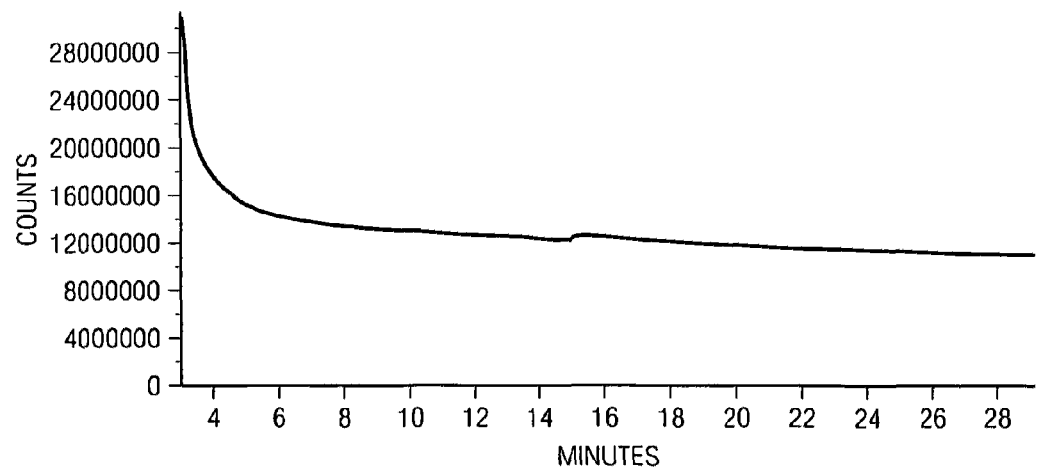
Figure 11A:
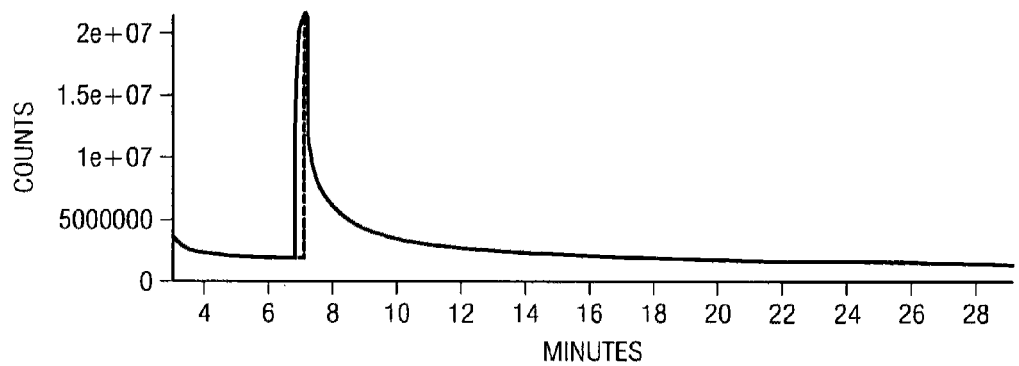
FIGS. 11(a)-11(c) are mass spectrographs similar to FIGS. 10(a)-10(c) but showing a) starting material containing 5,000 ppm of dimethyl methyl phosphonate (DMMP), b) two gm of KMnO4 reacted with 5,000 ppm of DMMP, and c) one gm of clay coated with 10% Mn(VII) oxide reacted with 5,000 ppm of DMMP. The absence of 7.09 min peak indicates the destruction of the DMMP compound. Pure clay did not destroy DMMP.
Figure 11B:
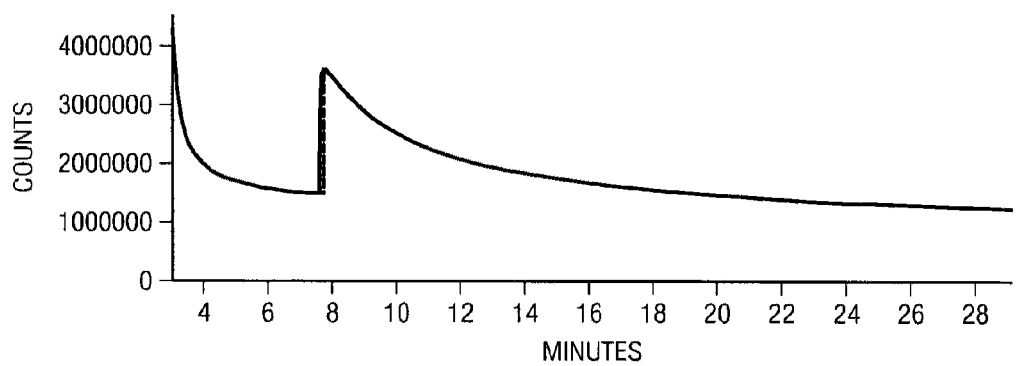
Figure 11C:
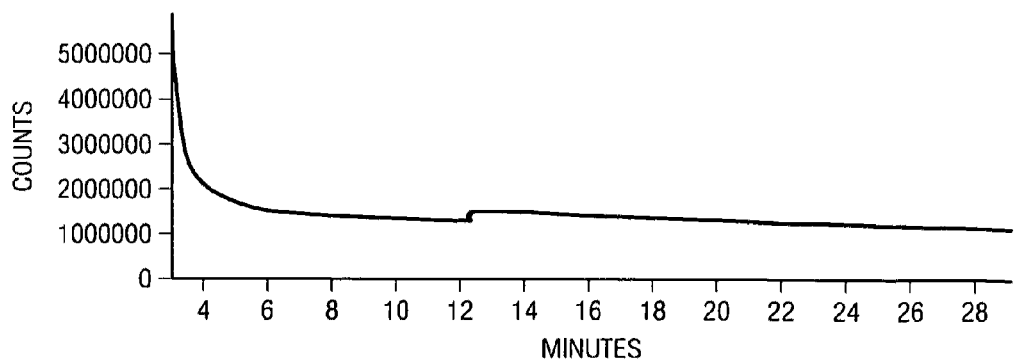

These studies were conducted using NM7O-clay and not NM7O-clay coated on non-woven fabrics. This research was initiated to determine the effectiveness of NM7O in removing CWA surrogates, again the chemistry of the these products and/or byproducts are such that they contain, N, S, P and O lone pairs of electrons which makes them suitable candidates (US Patent Pending). The original starting material showed a peak at 7.36 min with the corresponding Mass spectrum at mass 124, indicating the presence of starting material (FIG. 10 *a,b*). The CEES reacted with NM7O-clay did not contain any GC peak indicating its complete destruction (FIG. 10*c*). Similarly, when DMMP was reacted with NM7O-clay no 7.09 min peak with a mass of 124 (see FIGS. 11*a,b,c*) was observed indicating its complete destruction. Also, reaction of DMMP with NM7O-clay produced gas. The work is underway to analyze these gaseous byproducts. This study suggests that 100 mg of the compounds were destroyed per g of 10% coated MN7O clays. Further, research on our material can improve this destruction yield. The calculated amount of surrogates sorbed by the competing technologies were in the range of 0.15 mg g$^{-1}$ to 22.9 mg g$^{-1}$ (Lin and Klabunde, 1985, Lin and Klabunde, 1991, Wagner et al., 1999) and most of the reactions were carried out at elevated temperatures (>75° C.).

Summary of Key Points and Application Processes

It has been shown that NM7O can be incorporated into fibrous materials consisting of natural as well as man made fibers. Natural cellulosic fiber, cotton, and synthetic fibers, polylactic acid (PLA), polyurethane (PU), and blends of cotton/PLA were used, to demonstrate that NM7O can be incorporated in a variety of polymer structures. The amount of NM7O in the fabrics can be less than one percent up to greater amounts depending upon the end application. Typically 1-10% based on fabric weight may be sufficient for achieving desired performance properties.

Various nonwoven fabrics were treated with the NM7O solution using the dip-nip process of immersing the fabric/web in the solution and then squeezing the excess solution, followed by drying/curing. A fabric, film, or a web can be dipped in a solution containing NM7O, or NM7O with clay to incorporate the NM7O on to the polymeric structures. The solution can be aqueous or in any other safe solvent, where a stable dispersion of NM7O can be prepared. The solution may contain pure NM7O, or NM7O coated inorganic and organic exchangers depending on the application. The dipped fabric is squeezed to get the excess solution and to help force the dispersed solution into the fiber structure. The dipped, squeezed fabric is then heated in an oven to dry the solvent and to stick the nanoparticles in the substrate. Drying can be carried out at a range of temperatures up to as high as the substrate can withstand. Samples in these cases were dried at a range of temperatures from 75° C. to 135° C.

The techniques of the invention allow the incorporation of NM7O (as well as other Mn oxides) into nonwovens, which are expanding their use in many areas of critical applications. While nonwovens are fibrous materials produced in an economical way, they can be engineered with several specific desired properties. It will be obvious to those skilled in the art of textile chemistry that if these chemicals can be incorporated into nonwovens, they can be incorporated into any fibrous materials, such as, woven, knitted, or braided structures, as well as polymeric fibers, films or membranes.

The reactive NM7O of the invention can be added to any thermoplastic polymer, such as Polypropylene (PP), Polyethylene (PE), Polyethylene terephthalate (PET), Polybutylene terephthalate (PBT), Nylons, and elastomers to produce products such as fibers, films nonwovens and membranes. Thermoplastic polymers are extruded into different parts or shapes by initially melting the polymer, typically using an extruder, and then forcing the molten polymer through a die or into a mold, and then cooling to solidify it in that shape or form. The reactive nanoparticles can be added to the polymer during extrusion in many different ways. It can be added directly, as a blend if sufficient mixing can be achieved during processing. Otherwise, the particles can be separately compounded with a compatible polymer to produce a concentrate, and the concentrate can be blended with the polymer during the extrusion process. This helps achieve better dispersion of the particles and smoother processing, without any need for twin screw extrusion or additional mixing devices.

Alternatively, if these nanoparticels have to be added to non-thermoplastic polymers during processing, these can be added as a part of the solution, and the as the solution is cast into shapes, the nanoparticles will be part of the product fabricated. Examples of such products include polycrylonitrile (PAN), Viscose rayon and Kevlar fibers.

Furthermore, fabrics/webs/films can be coated on one side by knife coating, foam application, or spraying. In these processes, the NM7O can be coated on one side of the fabric/web/film instead of throughout the structure. During this process, instead of dipping the fabric in the solution, a solution or paste is applied on one surface of the fabric and then dried/cured. The amount of NM7O on the fabric can be adjusted by monitoring how much of the solution is applied on the substrate.

Meltblowing can be used to incorporate NM7O into nonwovens, wherein solid particles are incorporated within the fiber or fibrous material during melt spinning. This means that these additives can be incorporated in any manufactured fiber during fiber production. In melt blowing, as in melt spinning, a thermoplastic polymer is extruded through a spinneret. The extruded filaments are drawn down to diameters of few microns to submicron's using high velocity hot air. A master batch of NM7O in the polymer was prepared using a twin-screw extruder to achieve good dispersion. Then the compounded master batch was mixed with neat polymer in various proportions to achieve the desired final concentration of the NM7O in the final fiber/web. A melt blown fabric will have the NM7O incorporated in the fiber structure, and these are very stable and durable. Successful melt blowing is a demonstration that the NM7O can be extruded with the polymer during fiber spinning allowing the possibility of producing fibers with various levels of NM7O. In these cases, the NM7O concentration could be varied from less than one percent to five percent or higher. Samples were produced with up to five percent NM7O in the fabrics.

The incorporation of NM7O into fibrous materials consisting of natural as well as man made fibers can provide the following purposes, among others:

1. The amount of NM7O in the fabrics can be less than one percent to more than 100 percent based on the fabric weight. Typically 1-10% based on fabric weight may be sufficient for achieving desired performance properties.
2. The materials of the invention can be used to form Chemical and Biological Warfare suits (CWBA), wipes, membranes for water treatment, for removing toxic volatile compounds, algae, smell and pathogens.
3. Other uses include hospital beds and garments, industrial clothing including hazmat suits and first response team, gas masks, diapers (babies and incontinence patients), and undergarments for combat soldiers and astronauts; other uses are listed as follows:
4. Sportswear, including foot wear, socks, etc. to remove odor and biocide.
5. Bandage gauze to prevent infection in emergency rooms where blood contamination is a major problem.
6. Improvements in door air quality including planes and places where air is re-circulated. In air filters for odor removal and biocidal properties including Lewis base toxic gaseous products
7. Protective Garments as NM7O coated fabrics or films by themselves or as a part of the composite structure.
8. As part of military uniforms for soldier protection, military tents, wipes etc.
9. Water Filters to remove odor, biocidal and toxic Lewis base toxic compounds.
10. Wipes for household, industrial, military and medical applications, for destruction of selected toxic chemicals and organisms. For hospital applications, beds, bed covers, mattresses, curtains, wipes, curtain fabrics, bandage materials and coats as protective garments.
11. Sanitary products for women and diapers for babies and incontinence patience to remove odor and prevent bacterial growth and infection.
12. Wipes to remove chembio materials, peroxide and perchlorate based decontaminants
13. Wipes, dry and/or wet, for silver, brass and other metals polish.
14. For odor removal and antibacterial applications in pet care at homes or veterinary hospitals as part of fabrics or powders added on other substrates.

CONCLUSIONS

An invention has been provided with several advantages. Applicant's studies show that NM7O and NM3O coated clay can be embedded into a fabric matrix. The maximum coating was observed in the double coated through air bonded cotton/PLA web and meltblown polyurethane web. The air permeability data indicates that these webs have good permeability and its values did not change because of the incorporation of the MN7O. The double coated through air bonded cotton/PLA web and meltblown polyurethane web degraded mercaptan (rotten egg smell) to disulfide groups (fragrant smell). Therefore, a NM7O blended garment can be manufactured for the purpose of containing malodors. Furthermore, Applicant's studies show that a disposable silver polish wipe can be developed. The destruction of chemical warfare agents using surrogates indicates its potential application in disposal protective clothing for military, Haz-Mat team and First responders. In case of NM3O coated clay showed that it can make a good copper and brass polish. While the invention has been shown in several of its forms, it is not thus limited but is susceptible to various changes and modifications without departing from the spirit thereof.

What is claimed is:

1. A method for manufacturing a fabric from a fibrous material having protective properties, the method comprising the steps of:

preparing a quantity of Nanophase Mn (VII) Oxide (NM7O);

incorporating the NM7O into the fibrous material;

using the fibrous material to form a fabric wherein the amount of NM7O which is incorporated into the fabric is in the range from 1 to 10% by weight, based upon the weight of the fabric.

2. The method of claim 1, wherein the fibrous material is selected from the group consisting of natural and man made fibers.

3. The method of claim 2, wherein the fibrous material is selected from the group consisting of natural cellulosic fiber, cotton and synthetic cotton fibers, polylactic acid (PLA), polyurethane (PU), and blends of cotton/PLA.

4. A method of manufacturing a protective nonwoven fabric, the method comprising the steps of:
providing a suitable starting fabric in the form of a fabric web;
immersing the fabric web using a dip-nip process in a solution containing Nanophase Mn (VII) Oxide (NM7O);
squeezing out any excess solution;
then drying/curing the resulting fabric.

5. A fabric film/web having a polymeric structure which has been dipped in a solution containing Nanophase Mn (VII) Oxide (NM7O), or NM7O with clay support, whereby NM7O is adhered onto the polymeric structure to form a protective fabric.

6. A fabric film/web of claim 5, wherein the solution is an aqueous solution or a solution formed from a safe solvent in which a stable dispersion of NM7O can be prepared.

7. The fabric film/web of claim 6, wherein the solution contains pure NM7O, or NM7O coated onto inorganic and organic exchangers depending upon the end application.

8. The fabric film/web of claim 7, wherein the fabric has a fiber structure and wherein the fabric is squeezed to remove any excess solution and to help to force dispersed solution which is present into the fiber structure.

9. The fabric film/web of claim 8, wherein the dipped, squeezed fabric is then heated in an oven to dry any solvent which is present and to stick the particles of NM7O present in the substrate.

10. The fabric film/web of claim 9, wherein the fabric is selected from the group consisting of woven, knitted, or braided structures, as well as polymeric fibers, films or membranes.

11. A thermoplastic polymer which has been modified by the addition of a Nanophase Mn (VII) Oxide (NM7O) reactive agent which gives the polymer protective properties, the polymer being selected from the group consisting of thermoplastic polymers selected from the group consisting of Polypropylene (PP), Polyethylene (PE), Polyethylene terephthalate (PET), Polybutylene terephthalate (PBT), nylons, and elastomers, the modified polymer being used produce an end product selected from the group consisting of fibers, films nonwovens and membranes.

12. The thermoplastic polymer of claim 11, wherein the thermoplastic polymer is extruded into different parts or shapes by initially melting the polymer using an extruder, and then forcing the molten polymer through a die or into a mold, and then cooling to solidify it in the desired shape or form.

13. The thermoplastic polymer of claim 11, wherein solid particles of NM7O are incorporated within the fiber or fibrous material during a melt spinning operation.

\* \* \* \* \*